United States Patent [19]

Davis

[11] Patent Number: 5,328,034
[45] Date of Patent: Jul. 12, 1994

[54] MACHINE AND METHOD FOR SEPARATING RECYCLABLE MATTER

[75] Inventor: Robert M. Davis, Bonita, Calif.

[73] Assignee: CP Manufacturing, San Diego, Calif.

[21] Appl. No.: 930,739

[22] Filed: Aug. 14, 1992

[51] Int. Cl.⁵ .............................................. B07B 9/00
[52] U.S. Cl. ........................................ 209/31; 209/38; 209/39; 209/930; 209/37; 209/139.1; 209/218; 209/231
[58] Field of Search ...................... 209/12, 21, 38, 39, 209/143, 221, 228, 630, 702, 930, 218; 198/690.1

[56] References Cited

U.S. PATENT DOCUMENTS

| 345,383 | 7/1886 | Keisler | 209/218 |
|---|---|---|---|
| 707,088 | 8/1902 | Dings | 209/38 |
| 1,034,969 | 8/1912 | Brown, Jr. | 209/38 |
| 3,087,616 | 4/1963 | Pierson | 209/221 |
| 4,230,560 | 10/1980 | Nakajima | 209/221 X |
| 4,242,197 | 12/1980 | Voelskow et al. | 209/39 X |
| 4,318,804 | 3/1982 | Nakajima | 209/221 |
| 4,387,019 | 6/1983 | Dale et al. | 209/12 |
| 4,715,951 | 12/1987 | Krambrock et al. | 209/143 X |
| 4,929,342 | 5/1990 | Johnston | 209/12 |
| 5,091,077 | 2/1992 | Williams | 209/12 |
| 5,116,486 | 5/1992 | Pederson | 209/12 |

FOREIGN PATENT DOCUMENTS 2750191 5/1979 Fed. Rep. of Germany .
4214428 9/1992 Fed. Rep. of Germany .
2666537 3/1992 France .

OTHER PUBLICATIONS

Summary of Soviet Patent 1,369,795, issued Jan. 30, 1988.

*Primary Examiner*—D. Glenn Dayoan
*Assistant Examiner*—Tuan N. Nguyen
*Attorney, Agent, or Firm*—Baker, Maxham, Jester & Meador

[57] ABSTRACT

A machine for sorting recyclable matter includes a trommel for conducting and screening an input flow of recyclable matter and a magnetic mechanism coupled to the trommel for extracting magnetic material from the input flow while the trommel rotates. The input flow is dropped vertically from the trommel into a positive-pressure air separator which separates the flow into a first material stream including lightweight articles and a second material stream including relatively heavy articles. The heavy articles of the second material stream drop downwardly in the air separator. Padded baffles are provided in the air separator for reducing the downward velocity of the second material stream, which substantially lowers breakage of glass articles.

12 Claims, 3 Drawing Sheets

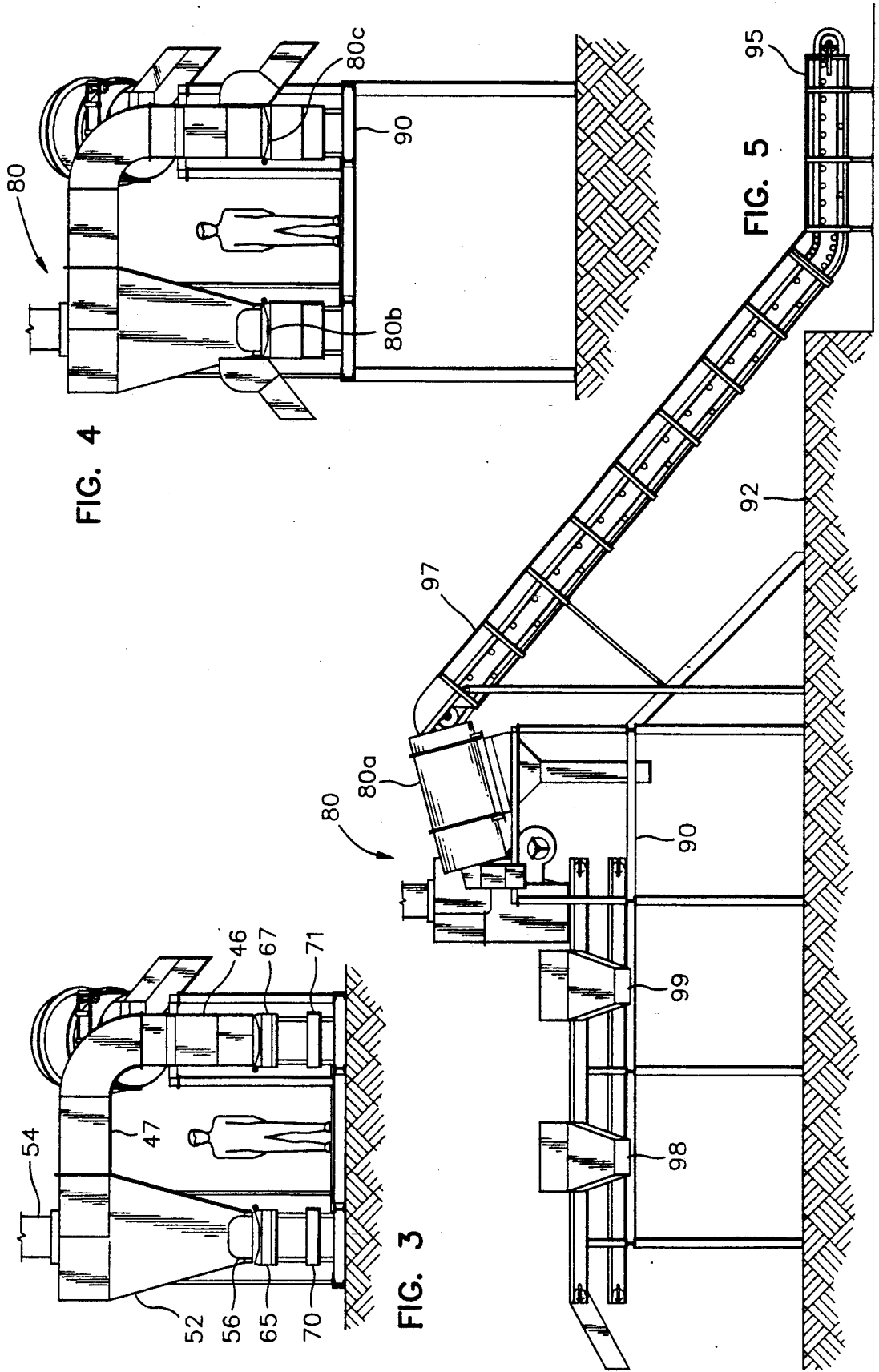

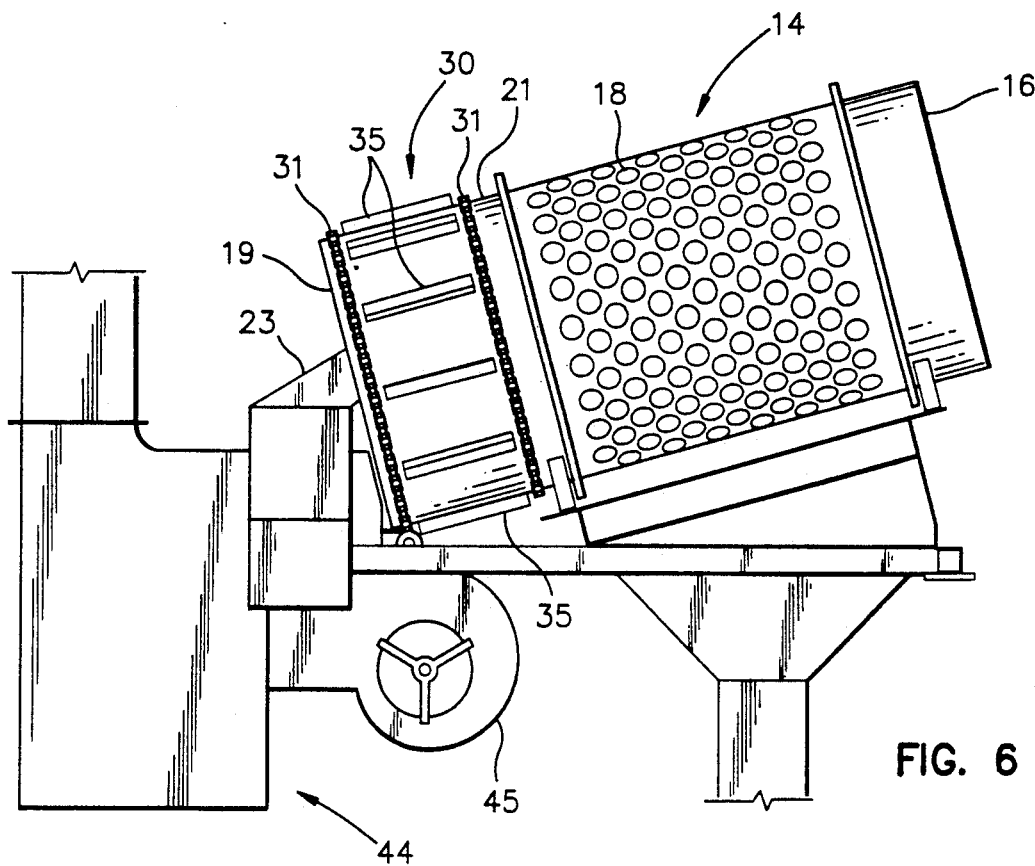
FIG. 6
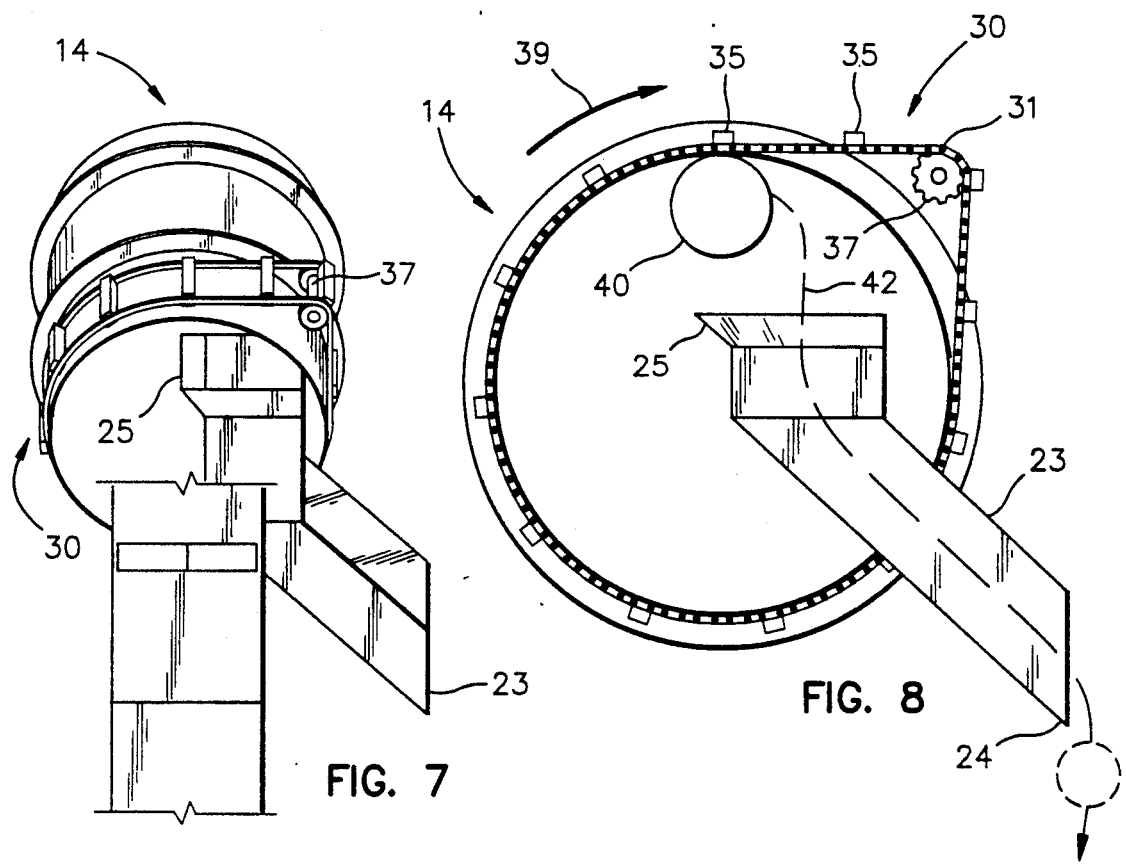
FIG. 7
FIG. 8

MACHINE AND METHOD FOR SEPARATING RECYCLABLE MATTER

BACKGROUND OF THE INVENTION

This invention concerns a machine for separating a heterogenous flow of recyclable matter into respective separate streams of recyclable material, with each stream including a respective homogenous class or classes of articles.

Machines are known which receive a heterogenous flow of recyclable matter and separate the flow into respective streams which include one or more homogenous classes of material. Presently, most of these machines separate the input flow into at least three separate material streams. The first stream includes magneto-responsive articles such as tin cans and ferrous scrap. The second stream consists of relatively light materials such as aluminum cans, plastic containers, and paper objects. The third stream includes relatively heavy articles such as glass containers, which are not responsive to a magnetizing force.

The known machines employ magnetic means to extract magneto-responsive materials. The resulting stream of recyclable matter is separated into the second and third streams by applying a high-velocity air flow, either in the form of a vacuum or a high-pressure air stream, to blow the lighter articles away from the heavier articles. The three streams are directed by these prior art machines to respective conveyor mechanisms for transport to sorting stations where human operators further classify and sort the streams.

Separator machines which are known in the art exhibit several significant disadvantages. First, most provide a stream of input matter which has been densified by collection, transport, and storage. The input stream is typically input to a separator machine on a conveyor, without having been loosened. This makes it more difficult to process the stream for separation and tends to retain small waste particles in the constituent materials, even after separation.

The relatively dense input flow leads to a second significant disadvantage of known separator machines. Such machines typically extract magneto-responsive articles relatively early in the separation process. Indeed, two such machines remove magneto-responsive articles at the top end of an inclined conveyor which carries the input stream. Early removal from a relatively dense stream frequently results in other articles being pulled out of the input stream with the magneto-responsive articles. Moreover, a dense and deep input stream can block or dislodge magneto-responsive articles from a magnetic extractor. Further, the mechanisms for extracting the magneto-responsive articles are large, expensive, and difficult to maintain.

A third significant disadvantage of known separator machines is the high breakage rate of glass containers. The glass containers normally are divided from other containers in an air separator which allows the glass containers to drop vertically. In such machines, glass containers are allowed to free-fall through the air separator mechanism to a conveyor. The conveyors move the glass containers at a relatively low speed, which results in falling glass containers impacting on other containers which are being transported by the conveyor. The result is a high frequency of glass-glass collisions and a very high rate of glass breakage. This is undesirable because of the potential of harm to human operators, because of the difficulty of extracting the broken material, and because of the creation of a significant amount of non-recoverable waste in the form of small glass particles.

SUMMARY OF THE INVENTION

The invention is based on the inventor's critical observation that positioning a trommel to receive the input flow of recyclable matter advantageously agitates the input flow, thereby reducing its density, and the further observation that an endless magnetic belt positioned at the output of the trommel effectively separates magneto-responsive articles from the agitated input flow. The inventor's third critical observation was that provision of baffles significantly reduced the velocity, the article-to-article impact and, therefore, the breakage of vertically-falling glass articles in an air separator.

These critical observations have resulted in the invention of a machine for separating recyclable matter. The machine includes:

a frame;

a trommel mounted to rotate on the frame, the trommel having an input opening and an output opening for conducting a flow of recyclable matter;

an endless magnetic belt coupled to the trommel for extracting magnetic material from the flow of recyclable matter in response to rotation of the trommel;

a positive-pressure air separator mounted on the frame adjacent the trommel for:

receiving the flow of recyclable matter; and separating the flow of recyclable matter into a first material stream including relatively lightweight articles and a second material stream including relatively heavier articles;

the air separator providing the second material stream in a substantially downward direction;

padded baffles in the separator for reducing the downward velocity of articles in the second material stream;

a first collection area;

a first conveyor mounted on the frame adjacent the air separator to receive the first material stream for conveying the relatively lightweight articles to the first collection area;

a second collection area; and a second conveyor mounted on the frame adjacent the baffles to receive the second material stream for conveying the relatively heavy articles to the second collection area.

With this invention, magneto-responsive articles are easily removed from the flow of recyclable matter to a significantly reduced accompaniment of other articles. The invention also effectively separates relatively lightweight articles from heavier glass articles with an unexpected and surprising reduction in glass breakage.

These benefits, and other features and advantages of the invention will be appreciated when the following detailed description is read with reference to the below-described drawings.

BRIEF DESCRIPTION OF THE DRAWINGS

FIG. 3 is a front elevational view of the machine of FIG. 1.

FIG. 4 is a front elevational view of the machine of FIG. 1 on an elevated mezzanine.

FIG. 5 is a side elevational view of the machine of FIG. 4.

FIG. 6 is a magnified partial side elevational view of a trommel and magnetic separator in the machine of FIG. 1.

FIG. 7 is a perspective view along the trommel of FIG. 6 from its front end.

FIG. 8 is a elevational view of the front end of the trommel of FIG. 6.

DETAILED DESCRIPTION OF THE PREFERRED EMBODIMENT

Figure 1:
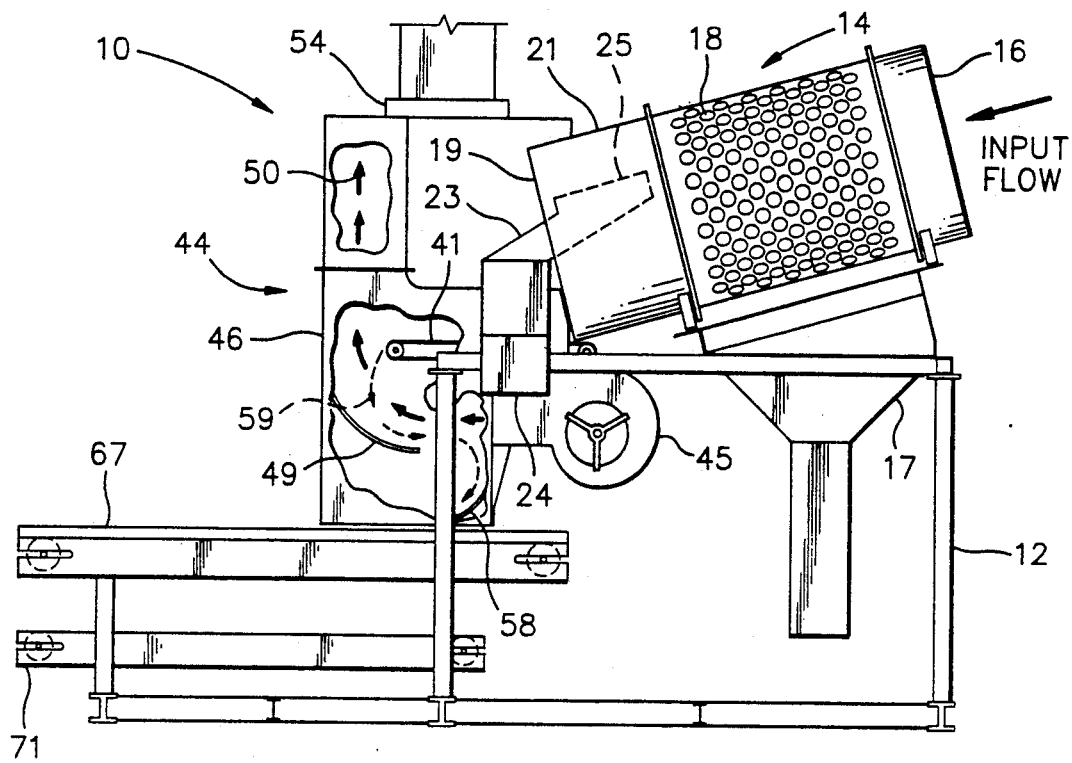
FIG. 1 is a side elevational view, partially cut away, of a machine which separates recyclable matter according to the invention.
Figure 2:
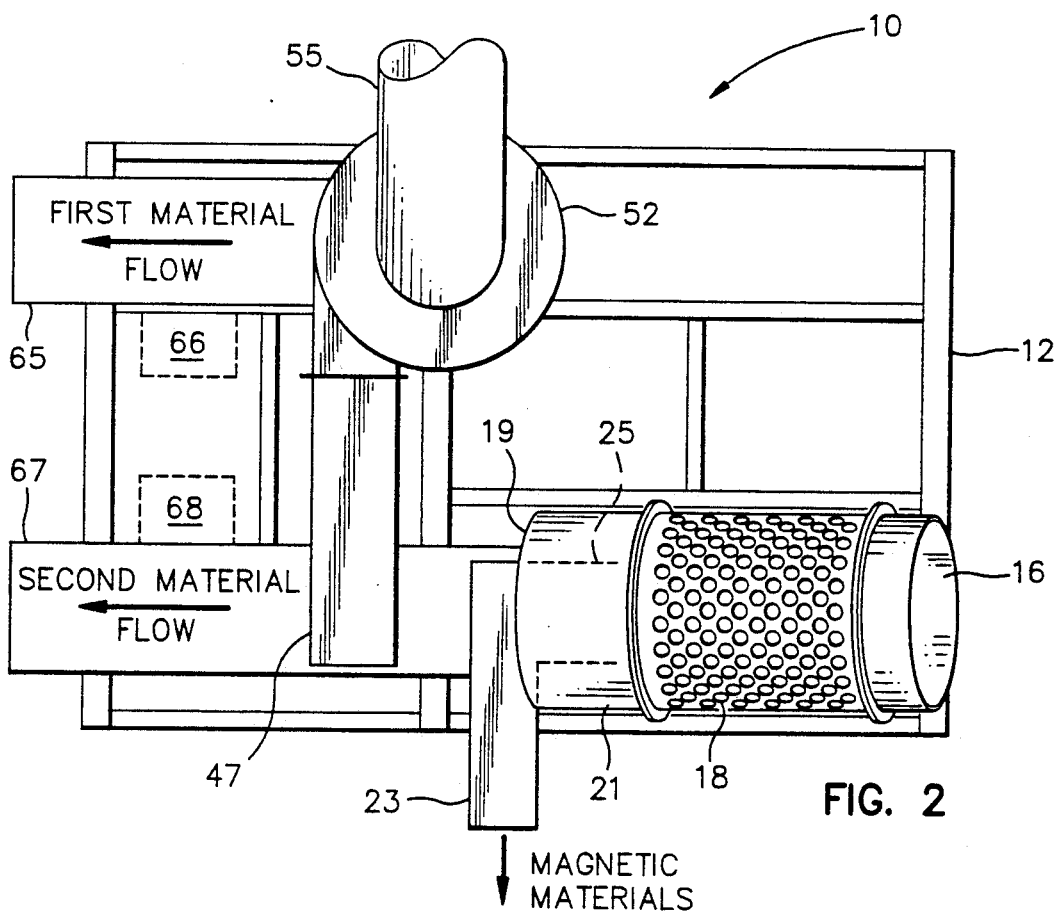
FIG. 2 is a plan view of the machine of FIG. 1.

The present invention is a machine for separating recyclable matter, a preferred form of which is shown in FIGS. 1-3. The machine is referred to generally by reference numeral 10, and it includes a frame 12 on which a trommel 14 is rotatably mounted. The trommel 14 includes an open input end 16 into which an input flow of recyclable matter is provided by conventional means which are not shown, but which can include, for example, a hopper and an upwardly-extending conveyor. The trommel 14 is rotatably mounted by conventional means on the frame 12 and rotates thereon to agitate and loosen the input flow of recyclable matter. At the same time, non-recyclable waste in the form of relatively small particles is separated from, and screened out of, the agitated input flow through the perforations 18 in the side surface of the trommel. This waste is collected and conducted from the trommel through a chute 17 positioned on the frame 12, underneath the trommel. The trommel is mounted at a slant so that its open discharge end 19 is relatively lower than its input end 16. The discharge end 19 of the trommel is the lower periphery of an unapertured annulus 21 between the apertures 18 and the discharge end 19. Magneto-responsive materials are extracted from the agitated, screened input flow in this annulus 21 and are received in a chute 23 having a receiving end 25 that projects through the discharge end 19 into the annulus 21. The mechanism for extracting the magnetic materials from the agitated, screened input flow is illustrated in FIGS. 6, 7, and 8.

The mechanism for extracting magneto-responsive articles (also referred to as "magnetic" articles) includes a magnetic endless belt mechanism 30 that includes a pair of parallel endless belts 31. The belts are, preferably, assembled from metallic links that are durable enough to support and carry a plurality of elongate bar magnetics 35 which are coupled to the endless belts 31. The magnetic endless belt mechanism passes around the annulus 21 and a belt roller 37 which is spaced from the trommel 14. As best seen in FIGS. 7 and 8, the belt roller 37 includes two teethed portions which engage the links and the endless belts 31. The magnetic endless belt mechanism 30 is tensioned between the belt roller 37 and the annulus 21 so that the belt mechanism is in driving engagement with the trommel 14. The magnetic endless belt mechanism may either idle on the trommel 14 as the trommel is rotated by means which are well-understood but not illustrated, or it may be used to drive the trommel, assuming a suitable means (not shown) for driving the belt roller 37.

In operation, the trommel 14, magnetic endless belt mechanism 30, and drive roller 37 all rotate together. Assuming rotation in the direction indicated by the arrow 39 in FIG. 8, magnetic articles in the agitated, screened input flow of recyclable matter are attracted by the magnets 35 whose fields extend through the inner surface of the annulus 21. The magnetic articles are held against the inner surface of the annulus 21 until they reach the location indicated by the article 40. At this location, the magnetic endless belt mechanism 30 disengages from the annulus 21, which quickly reduces and soon eliminates the magnetic field which holds the magnetic article 40 against the inner surface of the annulus. When this occurs, the magnetic article 40 drops along the path indicated by the dotted arrow 42 and is received in the end 25 of the chute 23. The chute 23 conducts the magnetic article 40 to an exit point 24 where the article drops out of the chute into a collection bin (not shown). The inventor contemplates that other mechanisms could serve the function of the chute 23 in receiving and conducting away magnetic articles from the trommel 14. For example, out feed from the trommel could be by way of a conveyor parallel to the trommel and mounted to extend part way into the annulus 21.

Returning to FIGS. 1, 2, and 3, the materials in the input flow of recyclable matter which do not respond to the magnetic endless belt mechanism fall out of the discharge end 19 of the trommel 14 onto a conveyor 41. These materials are provided by the conveyor 41 to an air separator 44.

The air separator 44 includes a continuous closed duct with a lower section 46 (which is shown partially cut away in FIG. 1 for purposes of illustration). As best seen in FIGS. 2 and 3, the lower duct section 46 transitions to a closed upper section 47. The air separator 44 includes a high-capacity blower 45 which communicates with the duct 46, 47, blowing a high velocity stream of air at a positive pressure into the lower duct. The stream of air is deflected upwardly in the duct 46 by a baffle 49. The high-velocity air stream continues upwardly in the chute section 46 along the path indicated by the solid arrows 50. The high-velocity air stream is conducted through the upper chute section 47 to a cyclone mechanism 52 with an upper exit port 54 and a lower exit port 56.

In operation, the air separator receives the agitated, screened input flow of recyclable matter from which magnetic materials have been removed. The flow falls off the end of the conveyor 41 into the lower duct section 46. As the flow of matter falls vertically toward the baffle 49, it is further agitated by the high velocity air stream so that relatively light articles such as plastic and aluminum containers, other plastic articles, and paper articles are transported by the stream of air in a first material stream upwardly in the lower duct 46 through the upper duct 47 into the cyclone 52. The cyclone 52 operates conventionally, circulating the stream of air and condensing it at its lower end so that an upwardly moving, low pressure area is formed in the center of the cyclone which conducts very light material such as plastic bags, sheets of paper, and so on, from the first material stream to the upper output port 54 while heavier articles, such as plastic and aluminum containers are thrown to the wall of the cyclone 52 and fall downwardly along the wall through the output port 56. Preferably, a duct 55 connected to the upper output port 54 conducts the very light materials from the cyclone 52 to a collection area (not shown).

Returning to FIG. 1, the high velocity stream of air is not sufficiently powerful to propel heavier articles, such as glass containers, upwardly in the lower chute 46.

Consequently, these articles fall downwardly off the end of the conveyor 41, forming a second stream of relatively heavier articles. The downward velocity and the impact force of articles in the second material stream are reduced by the baffle 49 and a second baffle 58. As shown in the cross-section of FIG. 1, the baffles 49 and 58 are curved in such a manner that articles in the second material stream follow the path indicated by the dashed arrows 59, falling first to the first baffle 49 where their downward fall is intercepted and translated horizontally and wherefrom the articles fall to the second baffle 58, which again translates the falling direction of the articles into a substantially horizontal direction. Preferably, the baffles 49 and 58 are padded with a hardy resilient material which will absorb much of the force of impact produced when articles fall against the baffles. The padded baffles 49 and 58 significantly reduce the breakage of articles in the second material stream.

As FIGS. 2 and 3 illustrate, the first and second material streams are directed to spaced-apart, substantially parallel conveyors 65 and 67 which are conventionally mounted and conventionally driven on the frame 12. The air separator upper duct 47 extends transversely above these conveyors between the lower duct section 46 and the cyclone 52. The conveyor 65 receives the relatively heavier articles in the first material stream which fall out of the exit end 56 of the cyclone 52 and conduct those articles past a sorting location 66 where a human operator may stand and visually classify and manually sort articles in the first material stream. Similarly, the second conveyor receives articles in the second material stream, conveying them past a sorting location 68.

As FIGS. 1 and 2 illustrate, the lower baffle 58 in the air separator 44 horizontally translates the direction of articles falling downwardly in the lower duct section 46 into a direction parallel with the direction of movement of the conveyors 65 and 67. This places the articles on the conveyors and contributes significantly to reduction of breakage.

A respective conveyor is positioned beneath each of the conveyors 65 and 67. These conveyors, 70 and 71, are provided to receive trash and other non-recyclable objects which may be carried with the first and second material streams. Such objects would be manually removed by the human operators positioned at the sorting locations.

FIGS. 4 and 5 illustrate a second embodiment of the invention in which the separator machine described above and indicated generally by reference numeral 80 in these two figures is mounted on a raised mezzanine 90. In this embodiment, the mezzanine 90 elevates the sorting machine 80 above floor level 92. The input flow of recyclable matter fed to the trommel 80a is provided from an input hopper 95 from which it is raised to the input end of the trommel 80a by an upwardly-inclined conveyor 97. As shown in FIGS. 4 and 5, the first and second material stream conveyors 80b and 80c pass sorting locations which are served by sorting chutes, such as the chutes 98 and 99.

The embodiment of FIGS. 1, 2, and 3 is intended to be a relatively portable one, easily stored, transported, and assembled, and then easily disassembled for relocation. The second embodiment illustrated in FIGS. 4 and 5 is intended to be a relatively permanent installation adapted for high-speed, high-volume separation assisted by a plurality of human operators.

Obviously, many variations of the above-described embodiments will occur to one skilled in the art and such variations may be made without departing from the spirit and scope of the claims which follow.

I claim:

1. A machine for separating recyclable matter, comprising:
    a frame;
    a trommel means mounted to rotate on the frame, the trommel means having an input opening and an output opening for conducting a flow of recyclable matter from the input to the output opening;
    an annulus on the trommel means substantially at the output opening;
    a rotatable magnetic means coupled to the annulus to rotate with the trommel means for extracting magnetic material from the flow of recyclable matter in the trommel means in response to rotation of the trommel means;
    a means for generating a high-velocity stream of air;
    air separator means coupled to the means and mounted on the frame adjacent the output opening of the trommel means for:
        receiving the flow of recyclable matter; and
        in response to the high-velocity stream of air, separating the flow of recyclable matter into a first material stream including relatively lightweight articles and a second material stream including relatively heavier articles;
    the air separator means providing the second material stream in a substantially downward direction;
    a baffle means in the air separator means for;
        directing the high-velocity stream of air upwardly into the air separator means; and
        reducing the downward velocity of the second material stream;
    a first collection area;
    a first conveyor means mounted on the frame adjacent the air separator to receive the first material stream for conveying the relatively lightweight articles to the first collection area;
    a second collection area; and
    a second conveyor means mounted on the frame adjacent the baffle means to receive the second material stream for conveying the relatively heavier articles to the second collection area.

2. The machine of claim 1, wherein the magnetic means includes:
    a belt roller mounted on the frame and spaced from the trommel means;
    an endless belt passing around the annulus and the belt roller, the endless belt in driving engagement with the annulus and the belt roller; and
    magnets mounted on the endless belt for generating a magnetic field which extends substantially from the endless belt through the trommel means.

3. The machine of claim 2, further comprising a chute means mounted on the frame and having a first end extending into the trommel means at the trommel means output opening for receiving magneto-responsive articles from the magnetic means.

4. The machine of claim 1, further including a chute mounted on the frame adjacent the trommel means for receiving waste material screened by the trommel means from the flow of recyclable matter.

5. The machine of claim 1, wherein the air separator means includes:

a cyclone mounted on the frame adjacent the first conveyor means; and a duct mounted on the frame to couple the cyclone to the means for generating a high-velocity stream of air;

the duct including a first, substantially vertically oriented lower section coupled to the means for generating a high-velocity stream of air and having a first opening adjacent the trommel means output opening for receiving the flow of recyclable matter, a second opening beneath the first opening for receiving the high-velocity stream of air, and a third opening beneath the second opening and adjacent the second conveyor means for conducting the second material stream to the second conveyor means; and the duct including a second, substantially horizontally-oriented upper section positioned above, and coupled to, the first, vertically-oriented lower section and to the cyclone for conducting the first material stream to the cyclone.

6. The machine of claim 5, wherein the baffle means includes at least a first baffle held in the first lower section of the duct beneath the first opening and adjacent the second opening, the first baffle extending in the first section to intercept the downward direction of the second material stream and to substantially horizontally deflect the second material stream.

7. The machine of claim 6, wherein the first baffle is a padded baffle.

8. The machine of claim 6, further including a second baffle positioned in the first section beneath the first baffle to intercept the substantially downward direction of the second material stream and to substantially horizontally deflect the second material stream onto the second conveyor means.

9. The machine of claim 8, wherein the second baffle is a padded baffle.

10. The machine of claim 1, further including a third conveyor means mounted on the frame adjacent the output opening of the trommel means and the air separator means for conducting the flow of recyclable matter from the output opening to the air separator means.

11. The machine of claim 1, further including:
first trash conveyor means mounted on the frame adjacent the first conveyor means and for conveying trash from the first collection area; and
second trash conveyor means mounted on the frame adjacent the second conveyor means for conveying trash from the second collection area.

12. A method for separating articles in a stream of recyclable matter, comprising:
providing a flow of recyclable matter;
loosening the recyclable matter by agitating the flow;
substantially concurrently with the loosening step, removing magneto-responsive articles from the flow of recyclable matter;
substantially simultaneously with the steps of loosening the flow of recyclable matter and removing magneto-responsive articles, screening waste material of a relatively small size from the flow of recyclable matter;
applying an upwardly-directed high-velocity stream of air to the flow of recyclable matter;
in response to the high-velocity stream of air, providing from the flow of recyclable matter a first material stream of relatively light-weight articles in a substantially vertically upward direction;
substantially simultaneously with the step of applying a high-velocity stream of air, providing from the flow of recyclable matter a second material stream of relatively heavier articles in a substantially vertically downward direction;
reducing the downward velocity of the second material stream by deflecting the relatively heavy articles from the vertically downward direction to a substantially horizontal direction;
collecting articles in the first material stream at a first collection area; and
collecting articles from the second material stream at a second collection area.

* * * * *